June 23, 1931.  T. J. LAW  1,811,140

VISOR SIGNAL FOR MOTOR VEHICLES

Filed April 1, 1930

Inventor
T. J. Law
By Watson E. Coleman
Attorney

Patented June 23, 1931

1,811,140

UNITED STATES PATENT OFFICE

THOMAS J. LAW, OF CLEAR LAKE, SOUTH DAKOTA

VISOR SIGNAL FOR MOTOR VEHICLES

Application filed April 1, 1930. Serial No. 440,821.

This invention relates to improvements in signal devices for motor vehicles and pertains particularly to a combination signal and windshield visor.

The primary object of the present invention is to provide a signal at the front of a motor vehicle which may be employed for indicating to the drivers of approaching vehicles the intentions of the driver of the vehicle to which the signal is applied with regard to the movement of his vehicle.

Another object of the invention is to provide a combined visor and signal by means of which all of the benefits of both devices may be had without materially altering the appearance of the front of the motor vehicle.

Still another object of the invention is to provide a combination visor and signal of the character described which will be of neat and attractive appearance, simple in construction and relatively economical to manufacture.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

Figure 1:
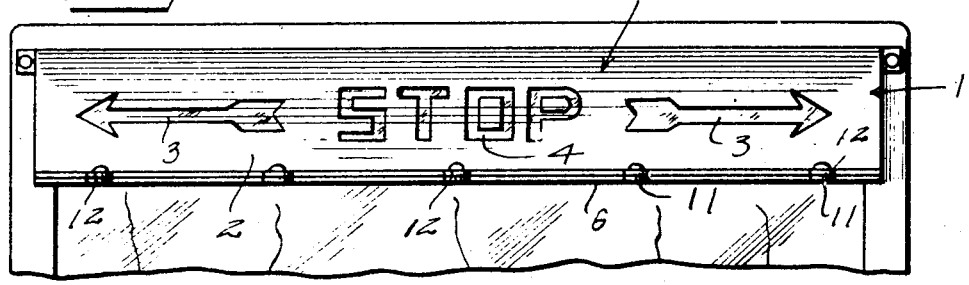
Figure 1 is a view in front elevation of the combined visor and signal embodying the present invention.
Figure 2:
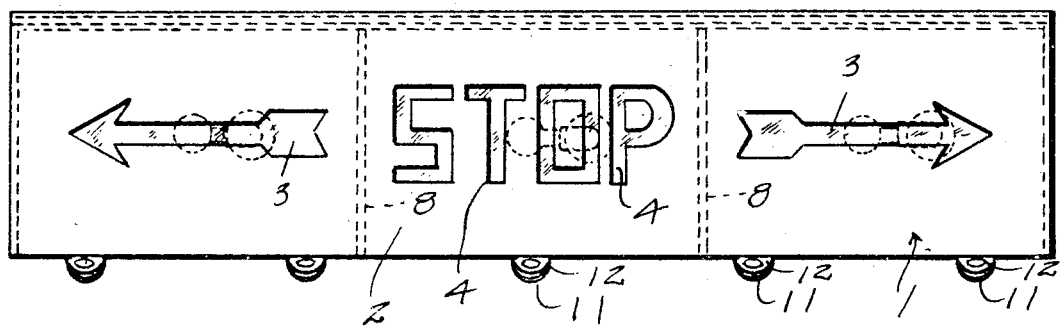
Figure 2 is a view in top plan of the device.
Figure 3:
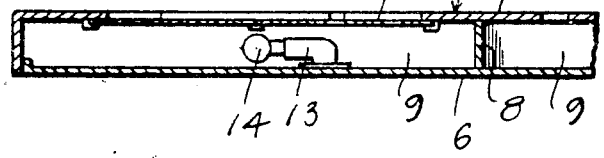
Figure 3 is a view in longitudinal section through one end of the device.
Figure 4:
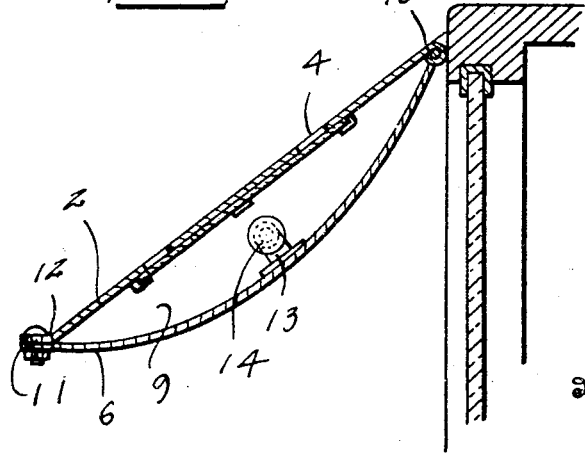
Figure 4 is a view in transverse section of the device as applied.

Referring more particularly to the drawings wherein like numerals of reference indicate corresponding parts throughout the several views, the numeral 1 indicates generally the combined visor and signal embodying the present invention, the same being shown in applied position. As shown the device consists of an elongated top plate 2 which may be formed of metal or any other suitable material, the plate being of a length substantially equal to the width of the vehicle windshield and of substantially the same width as the visors usually applied to motor vehicles. The plate body 2 is provided adjacent each end with a longitudinally extending cut-out 3 which may be in the form of an arrow as shown, the central portion of the plate being provided with a cut-out area 4 which may present to the view of an observer the word "Stop" or any other word desired.

The usual means may be employed for mounting the plate 2 across the top of a windshield and since the means selected may be of any character and forms no part of the present invention a description of the same is believed unnecessary.

Secured against the under surface of the plate 2 is a glass panel or sheet 5 which closes the apertures 3 and 4 and while permitting light to show therethrough as will be hereinafter described prevents the entrance into the signal of rain or dirt.

Against the under face of the plate 2 and the glass 5 carried thereby there is positioned a casing 6 which is of the same length as the plate 2 and for which the plate 2 forms a top. As shown this casing 6 is preferably formed to present an arcuate cross-sectional contour, there being a wall 7 at each end and intermediate the ends a pair of transverse walls 8 which divide the casing up into three chambers each of which is indicated by the numeral 9.

The rear edge of the casing 6 is swingingly attached to the rear edge of the plate 2 by means of the hinge members 10 while the forward edge thereof carries a plurality of apertured ears 11 which are attached by bolts or other suitable means to similar ears 12 projecting from the forward edge of the plate 2.

In each of the compartments 9 an electric light socket 13 is mounted in which a light bulb 14 is placed, suitable electric wiring being provided whereby the operator of the vehicle may selectively illuminate the chambers.

From the foregoing description it will be readily seen that by making the casing 6 of shallow construction there will be no interference with the vision of the driver of a vehicle to which the device is applied and the device in addition to shading the eyes of the driver will materially assist him in the operation of his machine by indicating to persons approaching what his intentions are with regard to the movement of the machine. By providing the inner surface of the casing 6 with a suitable polish or by constructing the same of a metal which will take and retain a sufficient polish it will be readily seen that the apertures 3 and 4 will be thoroughly brightly illuminated when the incandescent light therebeneath is energized.

Having thus described my invention, what I claim is:

1. A motor vehicle signal comprising an elongated shallow casing including a flat top plate apertured to outline a signal symbol, means for mounting said casing at one edge to and at the top of a motor vehicle windshield to constitute a visor therefor, means for illuminating the interior of the casing, and means connecting the body portion of the casing with the top thereof whereby the body portion may be shifted relative to the top to open the casing.

2. A combination motor vehicle windshield visor and signal comprising an elongated plate body having signal symbol apertures formed therethrough and constituting a visor for the vehicle windshield, a relatively shallow casing of substantially arcuate cross-section and of substantially the same length and width as the plate, hinge elements connecting one longitudinal edge of the casing with an adjacent edge of the plate, the plate constituting a top for the casing, means for detachably connecting the other edges of the plate and casing, and means for illuminating the interior of the casing beneath the signal symbols formed in the top plate.

3. A combination motor vehicle windshield visor and signal comprising an elongated plate body having signal symbol apertures formed therethrough and constituting a visor for the vehicle windshield, a relatively shallow casing of substantially arcuate cross-section and of substantially the same length and width as the plate, hinge elements connecting one longitudinal edge of the casing with an adjacent edge of the plate, the plate constituting a top for the casing, means for detachably connecting the other edges of the plate and casing, means for illuminating the interior of the casing beneath the signal symbols formed in the plate, and a translucent body overlying the under surface of the plate and the apertures formed therein.

4. A motor vehicle signal, comprising an elongated shallow casing formed in two sections, one of said sections constituting the top and being apertured to outline a signal symbol, the other of said sections having the longitudinal edges connected with the top section and being spaced intermediate its longitudinal edges from the top section, means for mounting the casing at the top of a motor vehicle windshield to constitute a visor therefor, and means for illuminating the interior of the casing.

In testimony whereof I hereunto affix my signature.

THOMAS J. LAW.